United States Patent [19]
Jones et al.

[11] Patent Number: 5,980,155
[45] Date of Patent: Nov. 9, 1999

[54] COMPOSITE GEOSYNTHETICS AND METHODS FOR THEIR USE

[75] Inventors: Colin John Jones, York, United Kingdom; Kjell Eng, Stroemstad, Sweden

[73] Assignee: University of Newcastle Upon Tyne, Newcastle Upon Tyne, United Kingdom

[21] Appl. No.: 08/693,240

[22] PCT Filed: Feb. 10, 1995

[86] PCT No.: PCT/GB95/00261

§ 371 Date: Nov. 19, 1996

§ 102(e) Date: Nov. 19, 1996

[87] PCT Pub. No.: WO95/21965

PCT Pub. Date: Aug. 17, 1995

[30] Foreign Application Priority Data

Feb. 10, 1994 [GB] United Kingdom .................. 9402598

[51] Int. Cl.$^6$ ............................. E02D 17/20; E02D 3/00; E02B 11/00

[52] U.S. Cl. ................................ 405/43; 405/36; 405/15; 405/129

[58] Field of Search ................................. 405/15–17, 54, 405/37, 38, 45, 46, 128, 129, 258, 270

[56] References Cited

U.S. PATENT DOCUMENTS

| | | |
|---|---|---|
| 3,252,155 | 5/1966 | Surtees et al. ......................... 405/54 X |
| 3,383,863 | 5/1968 | Berry ........................................ 405/270 |
| 4,404,516 | 9/1983 | Johnson, Jr. . |
| 5,056,960 | 10/1991 | Marienfeld ............................. 405/270 |
| 5,137,393 | 8/1992 | Fuhr et al. . |
| 5,288,168 | 2/1994 | Spencer ...................................... 405/54 |
| 5,358,356 | 10/1994 | Romanek et al. .................... 405/15 X |
| 5,362,182 | 11/1994 | Hergenrother .......................... 405/129 |
| 5,447,389 | 9/1995 | Olsen ...................................... 405/129 |

FOREIGN PATENT DOCUMENTS

| | | |
|---|---|---|
| 6428586 | 4/1987 | Australia . |
| 0390755 | 3/1990 | European Pat. Off. . |
| 0591963 | 10/1993 | European Pat. Off. . |
| 2471470 | 6/1981 | France . |

*Primary Examiner*—Tamara L. Graysay
*Assistant Examiner*—Frederick L. Lagman
*Attorney, Agent, or Firm*—Fulbright & Jaworski, LLP

[57] ABSTRACT

The invention relates to a novel geosynthetic which in a first embodiment comprises a composite geosynthetic comprising reinforcement material embedded in a drainage material; and in the second embodiment of the invention there is provided an electrically conducting geosynthetic which may be used in isolation or which may, alternatively, form a part of the composite geosynthetic.

19 Claims, 17 Drawing Sheets

A PROPOSED GEOCOMPOSITE DRAINAGE AND REINFORCEMENT MATERIAL

GEOGRID LOCKED INSIDE A THICK NON-WOVEN GEOTEXTILE (PROVIDING BOTH DRAINAGE AND REINFORCEMENT)

A THICK NON-WOVEN GEOTEXTILE (I.E. 4-8 MM THICKNESS)

G4

G5

G6

G7

G1G2

COMBINATION OF DRAINAGE GEOTEXTILE (G1) AND GEOGRID (G2) IN THE TESTS. (G1 G2) SAMPLE

LOW FRICTION DUE TO THE LUBRICATION BETWEEN SURFACES OF THE GEOTEXTILE

A PROPOSED GEOCOMPOSITE DRAINAGE AND REINFORCEMENT MATERIAL

GEOGRID LOCKED INSIDE A THICK NON-WOVEN GEOTEXTILE (PROVIDING BOTH DRAINAGE AND REINFORCEMENT)

A THICK NON-WOVEN GEOTEXTILE (I.E. 4-8 MM THICKNESS)

Stainless steel mesh 819 material

Brass material

COMPOSITE GEOSYNTHETICS AND METHODS FOR THEIR USE

The invention relates to geosynthetics, also known as and sometimes referred to as geotextiles, for use in the construction industry.

Geosynthetics are typically referred to by their principle function for any particular application and since there are essentially five principle functions there are five types of geosynthetics. These are filtration, separation, membrane, drainage and reinforcement geosynthetics.

Geosynthetics that are used for filtration typically prevent soils from migrating into drainage aqueducts or pipes while maintaining water flow through the system.

Geosynthetics that are used for separation prevent material, for example road based material, from penetrating into underlying material such as soft subgrade thus maintaining the design, thickness and integrity of a roadway.

Geomembranes are used in waste disposal and act as barriers to the passage of leakage out of or water into a waste disposal site.

Geosynthetics that are used for drainage allow water to drain from or through soils of low permeability, for example, they can be used for the dissipation of pore water pressures at the base of embankments.

Geosynthetics that are used for reinforcement add tensile strength to a soil mixture and thereby produce a more competent structural material. Reinforcement enables stable embankments to be constructed over very soft foundations and permits the construction of steep slopes and retaining walls.

The invention is in one aspect primarily, but not exclusively, concerned with drainage and reinforcement geosynthetics and therefore these types will be described in greater detail hereinafter.

Reinforcement geosynthetics can consist of high strength fibres set within a polymer matrix or encased within a polymer skin. The fibres provide the tensile properties for the material while the matrix or skin provides the geometrical shape and protects the fibres from damage. The matrix can be made from highly stable and durable polymers and the fibres can be engineered during manufacture to provide the required properties in terms of tensile strength and extension. Alternatively, the reinforcement geosynthetic can be made from a single material; ideally a high density polyethylene. In addition, the geosynthetic can be formed into specific geometric shapes which optimise the bond characteristics between the geosynthetic and the adjacent soil. Manufacturers determine the nature of a reinforcement geosynthetic such as its tensile strength, extension, structure, durability, temperature tolerance and cost. The complex interplay of these characteristics tends generally to define the type of reinforcement material to be used. However, in general, the tensile stiffness and strength of reinforcement geosynthetics is very important since deformation of reinforced soil is determined by stiffness and strength. Basically there are four main requirements for reinforcement geosynthetics;

1. Strength
2. Stiffness
3. Bond
4. Durability

A reinforcement geosynthetic must have sufficient strength to support the force required to achieve equilibrium in the soil. Moreover, it must have sufficient stiffness so that a required force can be mobilised at a tensile strain which is compatible with the allowable deformation in the soil. The geosynthetic must bond sufficiently with surrounding soil in order to transmit the required forces. This latter characteristic is less important for wide width reinforcement materials than for geostrips or geobars, mainly because the former have a much larger surface area over which to bond with the soil than the latter.

Finally, the geosynthetic must be durable. This means that time and environmental conditions must be considered. A distinction has to be drawn between a relatively short term application, for example reinforcing an embankment over soft soil, and a longer term application where creep becomes a significant consideration in assessing load carrying capacity. (Creep being an increase in extension of material under a constantly applied load). In practice, creep problems do not appear to be significant if high strength durable polymeric reinforcements are used. Further, the durability of material also has long term implications. Metallic reinforcement may be less favoured than non-metallic reinforcement in a long term engineering scheme because non-metallic reinforcement materials, although susceptible to degradation, tend to strongly resist corrosion, ie they are not sensitive to the presence of compounds such as soluble salts. Conversely, metallic reinforcements are vulnerable to corrosion, ie electrochemical reactions.

Reinforcement works, put simply, because when reinforcement materials are introduced into soil and aligned with the tensile strain direction they disrupt the uniform pattern of strain that would develop if the reinforcement did not exist. Further, reinforcement also inhibits the formation of continuous rupture surfaces through the soil with the result that the soil exhibits improved stiffness and shear strength. It follows that a reinforcement geosynthetic must adhere to the soil or be so shaped that deformation of the soil produces strain in the reinforcement.

Generally, the higher friction between the reinforcement and the soil the more efficient the reinforcement. Thus rough bar strip or sheet reinforcement is significantly better than a reinforcement with a smooth surface.

Implicit in the above is the fact that soil type has an important part to play in the effectiveness of soil reinforcement. Fill forms the largest component of any reinforced soil structure and the choice of which soil or fill material to be used will depend upon the nature of the structure in question. A large increase in cost of fill will lead to an overall increase in the total cost of the project. Typically, a well-graded cohesionless fill, such as sand, or a good cohesive frictional fill is used. Purely cohesive soils are seldom used but offer potential major economic benefits. The advantages of cohesionless fills are that they are stable, free draining and not susceptible to frost. [National standards tend to define the nature of fill and in the UK a frictional fill is defined as a material in which no more than 10% passes the 63 micron BS sieve (1987)]. However, not only is such material expensive it also may be difficult to come by. There are obvious advantages to be gained if a less costly and more easily available fill could be used. For example, in some areas of the world cohesionless fills are not indigenous and it would be advantageous if these areas were able to use a readily available cohesive fill. Unfortunately, many comprehensive national codes suggest that good quality cohesionless soil is required to construct reinforced soil structures.

A typical cohesive soil is a clay soil. Clay soils have the ability to take up water and to form a clay water mass which at its optimum consistency can be shaped and hold that shape after forming forces are removed. (When dealing with clay soil, engineers generally aim to affect the permeability characteristics of the soil by manipulating drainage and specifically by shortening the drainage path so as to speed up drainage). Because clay is impermeable it is difficult for pore water to be dissipated therefrom and when a load is applied to a clay foundation or fill it leads to increase in pore water pressure and decrease in effective shear strength. For this reason, the use of geosynthetic drainage materials may improve the shear strength properties of clay soils. The significance of this will become apparent hereinafter.

Drainage is also an important consideration in a reinforced soil structure. If such a structure becomes waterlogged the properties of the fill are changed and the tensile forces in the reinforcing elements increase. It is know that geosynthetics can be used for the purpose of drainage. Indeed, geosynthetics can serve two important hydraulic functions relating to cross-plane flow (filtration) and in-plane flow (in plane drainage). Less information is available about the properties of in-plane drainage than filtration. A drainage geosynthetic has voids (pores) and particles (filaments and fibres). Typically, the pore size bears a simple relationship to the particle size of the soil with which the geosynthetic is to be used.

Clearly, use of a drainage geosynthetic with a cohesive soil or fill will alter the properties of the cohesive soil or fill thus making it more favourable for use with a reinforcement material. Indeed, the friction characteristics of the soil or fill would be significantly improved if the soil or fill was well drained. If this was the case, then the requirement for expensive and/or imported cohesionless soil could be eliminated and greater use could be made of reinforced soil structures.

It is therefore an object of the invention to provide a geosynthetic material which has both drainage and reinforcement properties and therefore facilitates the use of non-standard materials such as cohesive soils in a reinforced soil structure.

However, when we began our investigations we found surprisingly that the provision of a geosynthetic material comprising a drainage material above or below a reinforcement material did not have the desired effect. In fact, we found when using this composite material that the shear strength of the fill, which is normally increased when the fill is used with either just a drainage material or a reinforcement material, was significantly reduced with respect to use with a geosynthetic having only one function. This was contrary to all expectations and indeed, having regard to the state of the art, contrary to any prior predictions.

Although we do not intend that the present application be limited by the following hypothesis, we consider that the expected increase in soil/fill shear strength, when using a drainage material in combination with a reinforcement material was not achieved because the reinforcement material was lubricated by the effect of the drainage material, thus reducing its ability to bond with the soil/fill so resulting in a decrease in the shear strength of the soil/fill.

However, our further investigations have led us surprisingly to a solution to the problem of how to advantageously increase the shear strength of a reinforced soil structure made of cohesive fill. The solution comprises the provision of a composite geosynthetic which is provided with drainage and reinforcement properties and which, surprisingly, is functionally superior to other geosynthetics, ie the increase in soil/fill shear strength of the composite geosynthetic is greater than the sum of use of each part of the composite independently. It would therefore seem that the composite geosynthetic functions synergistically.

According to a first aspect of the invention there is therefore provided a composite geosynthetic for use in the construction industry comprising a reinforcement material embedded within a drainage material such that the functional effectiveness of said geosynthetic is greater than the sum of the effectiveness of each of said materials.

It would seem that embedding or enveloping the reinforcement material within the drainage material overcomes the above hypothesised lubrication problem. Thus the material of the invention possesses both drainage and reinforcement properties which can be used to advantage in a reinforced land structure. Indeed, as mentioned, we have found that the use of such a material increases the shear strength of a cohesive soil/fill beyond that achieved with either a single reinforcement material or drainage material, or a single reinforcement material and drainage material.

In addition, our investigations have also lead us to experiment with the provision of an electrically conducting geosynthetic. We believe that such a geosynthetic would be advantageous because it would enhance the single function of the above referred to geosynthetics, such as improving drainage characteristics which in turn will also lead directly to improved shear strength of the adjacent soil and better adhesion between the geosynthetic and the soil.

Indeed, we consider that an electrically conducting geosynthetic would have application in a number of areas. For example, in addition to those described above, it would also have application in the removal of contaminants from soils.

We envisage two specific areas of application, these include:

(a) Drainage incorporating electroosmosis; and
(b) Combined drainage and reinforcement incorporating electroosmosis.

It is of note that although the electroosmotic phenomenon has been known since 1805 it has never before been applied to geosynthetics.

Insofar as (a) above is concerned, electroosmosis when used in conjunction with drainage has two effects:

(i) It can be used to induce consolidation of soil without applying the surcharge load, hence eliminating problems associated with bearing capacity failure during the application of surcharge on soil of low bearing capacity. The effect is similar to vertical drainage but without the need of surcharge to induce consolidation.

(ii) It enhances the apparent rate of consolidation by increasing the rate of water discharge from the site. Thus the time required to achieve a certain magnitude of settlement and shear strength can be reduced.

Insofar as (b) above is concerned electroosmosis induces negative pore water pressures in the vicinity of the anode thereby increasing the bond between the electrode and the soil. The increase in bond is instantaneous and can be made permanent. It is envisaged that the increase in shear strength together with the increase in bond will enhance the effectiveness of the geosynthetic acting as reinforcement in cohesive soil.

Insofar as removal of contamination from soil is concerned it is of note that economic restoration of contaminated soils to an environmentally acceptable condition is an important challenge facing the scientific and technical community.

A relatively new and potentially important in situ technique has emerged in which a dc electric field is applied across electrode pairs placed in the ground. The contaminants in a liquid phase in the soil are moved under the action of the field to wells were they are then pumped out.

The principal mechanisms by which contaminant transport takes place under the action of an electric field are electromigration, electroosmosis and electrophoreist. Electromigration is the transport of a charged ion in solution. In electroosmosis, a liquid containing ions moves relative to a stationary charged surface, as in a capillary pore. Electrophoresis is the mirror image of this process, in that a charged particle moves relative to a stationary liquid.

Soils contaminated by organics may be distinguished by whether the organic compounds are soluble or insoluble in water. Insoluble organics, such as heavy hydrocarbons, are essentially not ionised, and the soils in contact with them are not charged. The removal of insoluble organics by electric fields is limited to their movement out of the soil by electroosmotic purging of the liquid either with water and surfactant to solubilise the compounds or by pushing the compounds ahead of a water front. These procedures probably have limited applicability. However, there exists a wide range of organics that are relatively soluble in water and in a weakly ionised state that may be classified as ubiquitous groundwater contaminants. These organics include aromatic compounds such as benzene, toluene, xylene and phonolic compounds, as well as chlorinated solvents. The aqueous solutions formed with soluble organic compounds when in contact with soils such as clays can be expected to give rise to soil zeta potentials for which electroosmotic convection will take place under the action of an applied electric field. Observations of the effects on contaminant removal of the electrode reactions, removal of the electrode reactions, adsorption on the soil, and reduction of zeta potential lead to the concept of the introduction of non toxic purge solutions at the electrodes. These solutions, typically used at the anode, serve as enhancing agents for contaminant removal where purge solutions are moved into the soil electroosmotically. Such reagents might include buffering compounds to control pH or enhance the zeta potential, as well as solutions to enhance desorption, increase solubility, or aid in flushing out the contaminants. Moreover, products of the electrode reactions that have a deleterious effect, such as the hydroxyl ions at the cathode, might be removed directly at the electrodes by flushing or chemical conditioning.

The application of an electric field appears to have an even greater potential for the removal of solubilised metals than for the removal of organics. This method shows promise because the metal ions are positively charged and the electroosmotic flow is enhanced by the electromigration of these cations to the cathode, at least when the soil is negatively charged. A number of studies have been reported on metals removal by electric fields. Some of the results are ambiguous because of the greater reactivity of many inorganic contaminants and, in the case of heavy metals, the sensitivity of their reaction equilibria to the pH of the saturating liquid. For the metals to be affected by the electric field, they must be present in solution in the saturating liquid. It has been suggested that the production of hydrogen ions at the anode, which leads to a low pH condition and an acid front that migrates to the cathode, would aid metal solubilisation from the soil.

An undesirable consequence of the promotion of acidic conditions in that the zeta potential, and hence the electroosmotic flow, could be suppressed by the large concentration of hydrogen ions in the acid. However, because the metals are present as charged ions, they can be removed by electromigration.

In designing an electrically conductive electrosynthetic a number of factors have been considered, these factors include:
  (i) In respect of drainage and filtration:
    (a) Water permeability.
    (b) Risk of blocking at the soil geotextile interface due to the formation of an almost impermeable layer composed of fine grained soil particles.
    (b) Risk of blocking at the soil geotextile interface due to the formation of an almost impermeable layer composed of fine grained soil particles.
    (c) Risk of clogging of the drain due to the passage of relatively coarse grained soil particles into the geotextile. If too many soil particles assemble in the drain it will reduce the discharge capacity.
    (d) During electroosmosis there is a possibility of gas generation at the electrodes. The gas generated must be dissipated effectively or else it will increase the contact resistance at the soil electrode interface and also hinder the development of negative pore pressure at the anode.
  (ii) In respect of the geosynthetic acting as an electrode:
    (a) Electrically conductive.
    (b) The current density through the electrode surface (especially the anode) should not exceed 20 Amperes/$m^2$ to prevent drying of soils close to the anode. Drying of soils near the anode will increase the soil resistance.
    (c) Relatively inert. If it oxidises, the oxide must be electrically conductive.
    (d) Direct in contact with the soil to minimise the contact resistance. A wet contact between the electrodes and the soil will minimise the contact resistance compared to a dry contact.
    (e) it is possible to have a layer of geotextiles between the electrodes and the soil. However in this case the geotextile must be saturated with water for the current to flow.

By combining the two requirements of the electroconductive geotextiles the proposed specification and probable configuration is an follows:
  1. The geotextile shall be a non-woven, needle punched geotextile. The fabric shall be resistant to the chemicals naturally found in soils and water.
  2. It shall be electrically conductive.
  3. It shall be relatively inert. If it oxidises, the oxide must be electrically conductive.

The physical properties of the geosynthetic material used in the current tests have the properties shown in Table 6. It is not intended that the information contained in this table should be construed so as to limit the nature of the invention, rather the information contained in this table is presented for the purpose of example only. It is envisaged that better results could occur with different geosyntheric materials.

For example, a possible electrically conducting geosynthetic could have the following configuration:
  (i) The geotextiles could be a non woven, needle punched geotextile made entirely of conductive material. The physical properties could be as specified in Table 6.
  (ii) The geotextile could be a non woven, needle punched geotextile. The physical properties could be as specified in Table 6 but with the conductive material as both sides.
  The advantages of this configuration include:
    (a) It can be laid directly on wet or dry soil surfaces. Its electrodes are in direct contact with the soil, hence the contact resistance is minimised.
    (b) It can be laid on both sides since the electrodes are at both sides of the geotextile.
  (iii) The geotextile could be a non woven, needle punched geotextile. The physical properties could be as specified in Table 6 but with the conductive material at only one side of the geotextile.
    In this case the geotextile must be laid with the conductive layer in contact with soils (dry soil). If the conductive layer is away from the soil, then the geotextile must be saturated for current to flow.

(iv) The geotextile could be a non woven, needle punched material. The physical properties could be as specified in Table 6 but with the conductive material at the centre of the geotextile.

The geotextile cannot be laid directly on dry soil. It needs to be saturated for current to flow to the soil.

Alternatively, a possible electrically conducting geosynthetic could simply comprise a selected conventional geosynthetic which has woven therein, or threaded therethrough, an electrically conducting filament or thread which may be single or multi-stranded. In the instance where the electrically conducting geosynthetic is woven, electrically conducting threads or filaments may be intertwined with or enmeshed within conventional geosynthetic materials and in the instance where the electrically conducting geosynthetic is provided in a threaded form any preselected number of passages of thread through the material may be made according to a user's requirement.

According to a yet further aspect of the invention there is therefore provided a geosynthetic having electrically conducting properties.

In a preferred aspect of the invention said electrically conducting geosynthetic incorporates or has applied thereto an electrically conducting material.

Preferably said material is either woven into said geosynthetic or threaded through said geosynthetic.

Preferably further still said material is in the form of a filament or thread and may be single or multi-stranded.

More preferably still said thread or filament may comprise a composite yarn which yarn includes at least one electrically conducting element.

In yet a further preferred embodiment of the invention said composite geosynthetic comprises said materials, at least one of which materials has electrically conducting properties.

Preferably the reinforcement material has electroosmotic properties.

In an ideal embodiment of the invention the reinforcement material is provided in the middle of the drainage material so that an equal amount of drainage material is provided on either side of the reinforcement material.

Preferably the drainage material is an in-plane geosynthetic.

Preferably the drainage geosynthetic is made of an appropriate polymeric material including, but not limited to, unwoven needle punched polypropylene fibres, or alternatively a composite geotextile made of meshed core spaces with filter on both sides.

Preferably the reinforcement geosynthetic is a geogrid.

According to an alternative embodiment of the invention there is provided a reinforced soil structure comprising a cohesive soil and a geosynthetic in accordance with the invention.

In a preferred embodiment of the invention the geosynthetic is orientated with respect to the soil such that it is aligned with the tensile strain in the system.

An embodiment of the invention will now be described by way of example only with reference to the following Tables and Figures wherein;

Table 1 represents details of the index properties of geosynthetics used in the following experiments;

Table 2 represents information concerning the nature and form of geosynthetics used in the following experiments;

Table 3 represents details of the index properties of Kaolin (clay);

Table 4 represents test results of consolidated—undrained compression Triaxial tests;

Table 5 represents test results of consolidated—drained compression Triaxial tests;

Table 6 represents a specification for an electrically conducting geosynthetic;

PROVISION OF A COMPOSITE GEOSYNTHETIC

Figure 1:
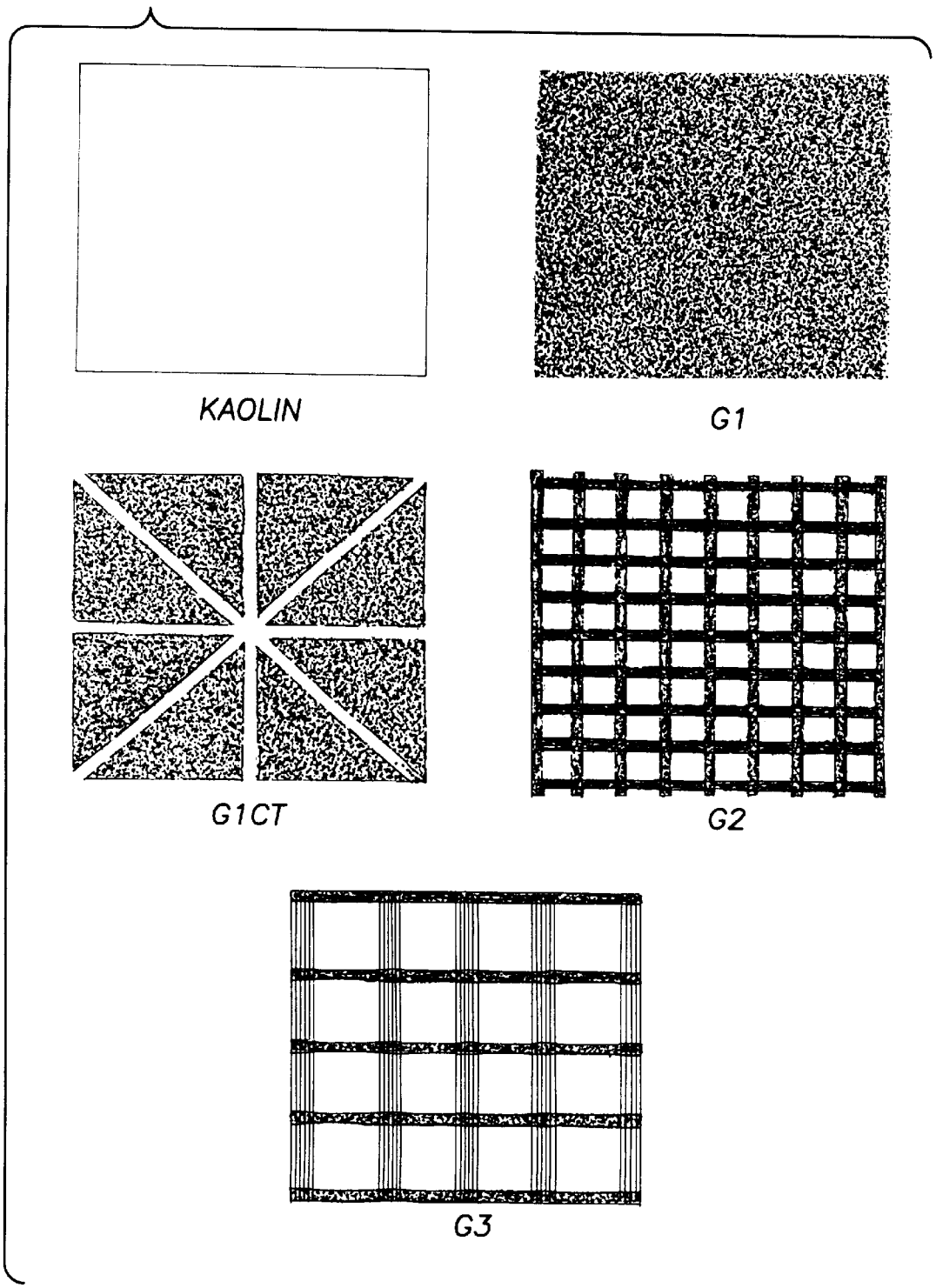
FIG. 1 represents information showing the physical properties of Kaolin G1, G1CT, G2 and G3.
Figure 2:
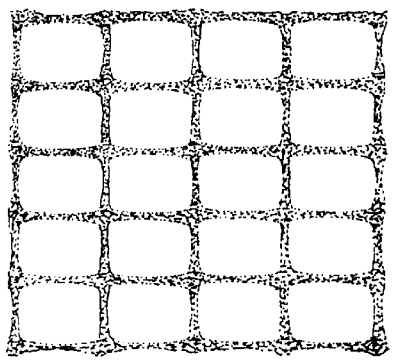
FIG. 2 represents information showing the physical properties of G4, G5, G6, G7, G1 and G2.
Figure 2:
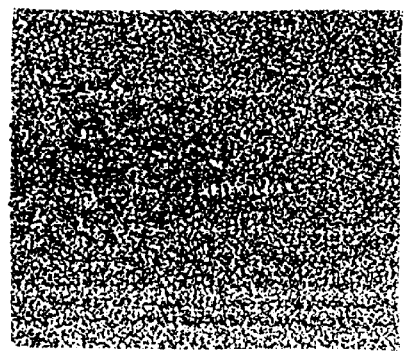
Figure 2:
Figure 2:
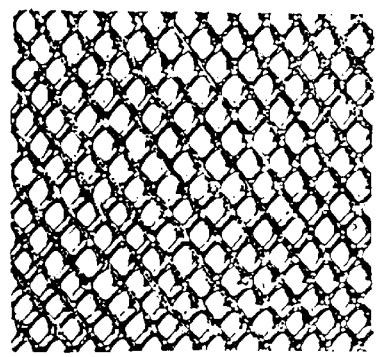
Figure 2:
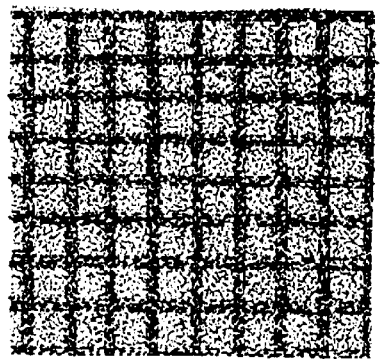

In the following experiments a number of geosynthetics were used. These were G1, G2, G3, G4, G5, G6 and G7. Information concerning these geosynthetics can be found in Table 1, Table 2, FIG. 1 and FIG. 2. Table 1 concerns details of the index properties of the geosynthetics. Table 2 concerns information about the nature and form of the geosynthetics and FIGS. 1 and 2 provide information concerning the physical structure of the geosynthetics.

In the following experiments, the clay mineral Kaolin was used. Details of the index properties of Kaolin are to be found in Table 3.

Geosynthetics G2, G3, G4, G5 and G7 are reinforcement geosynthetics whereas G1 and G6 are drainage geosynthetics.

Further, the action of geosynthetic G1 was limited to provide a drainage function only by cutting the intact material, thereby destroying any inherent reinforcement properties and this cut material is indicated in the Table and Figures as G1CT. Similarly, the material G6 was adapted to provide reinforcement properties only by removal of the outer filter membrane thus providing the geosynthetic G7.

As per the teaching in the art and as per our original expectations, we also provided a composite geosynthetic comprising G1 and G2 placed one on top of the other which we believe would provide both reinforcement and drainage thus enhancing the shear strength of the Kaolin. As will become apparent from the following, our results indicated the converse.

Triaxial Tests

Figure 3:
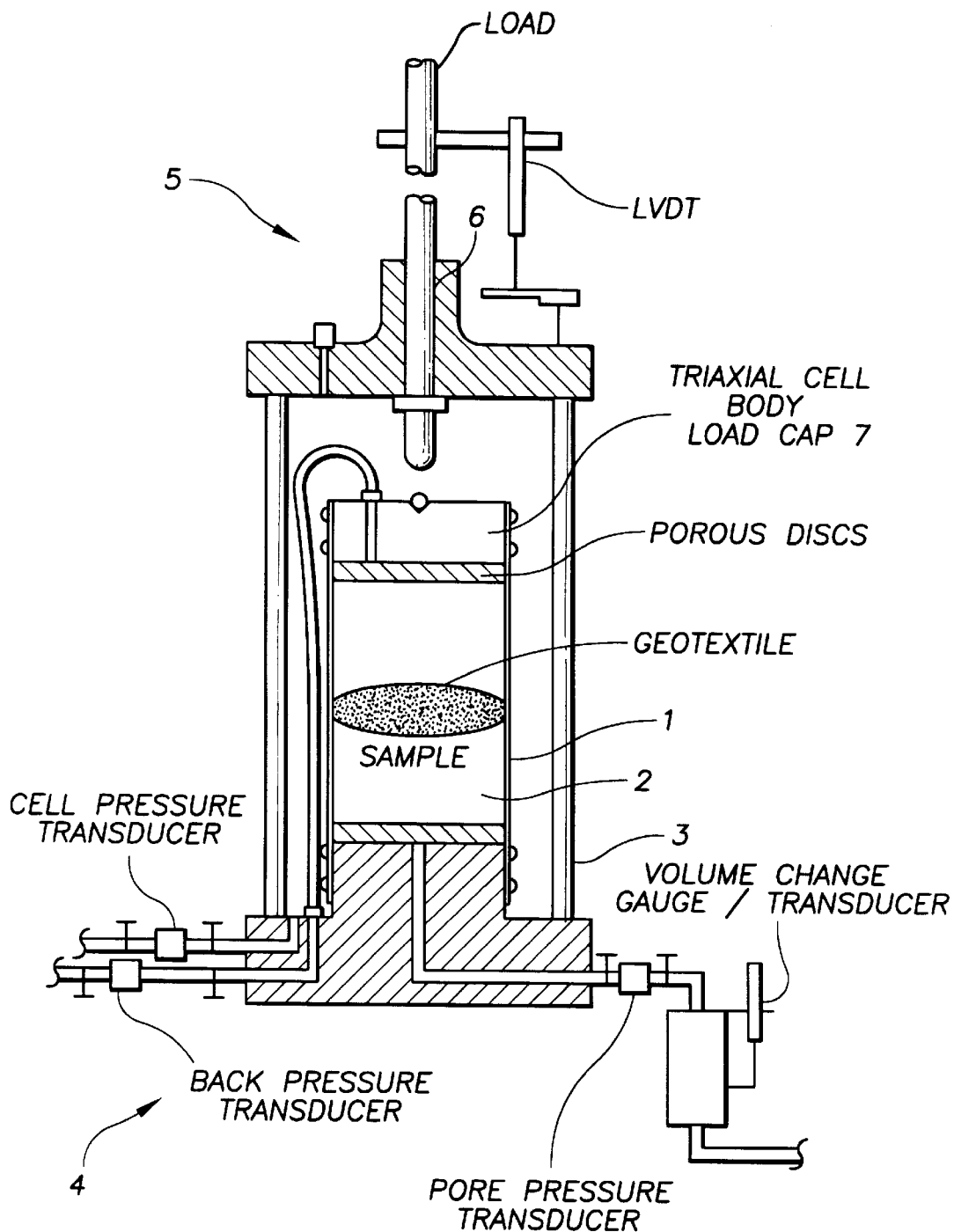
FIG. 3 represents a diagrammatic arrangement of a Triaxial test apparatus.

The Triaxial Test apparatus shown in FIG. 3 was used for the measurement of the shear strength of reinforced Kaolin. The test was thought to be appropriate because the principle stresses can be varied to simulate field conditions, the failure plane is not predetermined as in shear box and the pore pressure can be measured therefore an effective stress analysis can be undertaken. Both the Consolidated Undrained Triaxial Compression Test (CU-Test) and the Consolidated Drained Triaxial Compression Test (CD-Test) have been undertaken.

It will be apparent to those skilled in the art that the CU-Test represents site conditions where construction may be faster than the rate of pore pressure dissipation and the CD-Test represents site conditions following construction when drainage has taken place.

A selected geotextile of known properties was positioned within a load chamber 1 comprising the cohesive soil Kaolin 2. Chamber 1 was mounted within housing 3 provided, at its lowermost end, with pressure control means 4 so that the pressure within housing 3 and thus exerted on chamber 1 could be varied (thus mimicking the effective density and so depth of the sample within a soil structure). Towards the outermost end of housing 3 there is provided a load bearing means 5 which reciprocates in through-bore 6 so that, in a downwardly extended position, load 5 makes contact with the uppermost part of chamber 1 and so exerts a load bearing pressure on load cap 7 which pressure is in turn transmitted to Kaolin 2 and the geotextile within chamber 1.

During the application of a range of predetermined loads the shear strength characteristics of the Kaolin were measured. The results of the two different types of tests are to be found in Tables 4 and 5.

In the CU-Test the cohesive properties of the Kaolin were minimal when no geosynthetic was present. The cohesive shear strength parameter being 9.1 KN/m$^2$. Provision of a drainage geosynthetic G1 or G6 increased the cohesion significantly, the best results of 39.5 KN/m$^2$ being obtained with G6. Further, significant increases in cohesion were also found when any of the reinforcement geosynthetics G2, G3, G4, G5 or G7 were used on their own.

There was a slight reduction in cohesion when the drainage synthetic G1 was cut so as to remove any reinforcement properties from 26 KN/m$^2$ to 16.5 KN/m$^2$. Interestingly, removal of the filters from G6 to create geosynthetic G7 produced only a small reduction in cohesion from 39.5 KN/m$^2$ to 36 KN/m$^2$, suggesting that reinforcing properties of drainage material G6 may have an important part to play in the increase in shear strength of a soil fortified with G6.

In addition to the changes in the cohesive properties of the soil, the frictional properties ($\phi$) of the soil were also changed when different geosynthetics were incorporated in the soil although the changes were not so dramatic (see Table 4).

However, contrary to all expectations, the combination of a drainage geosynthetic, particularly G1, which increased cohesion from 9.1 KN/m$^2$ to 26 KN/m$^2$ (when used in isolation) with the reinforcement geosynthetic G2, which increased cohesion from 9.1 KN/m$^2$ to 25 KN/m$^2$ (when used in isolation) produced disappointing results. Cohesion above that present without any geosynthetic was only increased from 9.1 KN/m$^2$ to 16 KN/m$^2$. Thus, contrary to expectations, combining these geosynthetics did not have a synergistic effect. Nor were levels of performance associated with use of just one geosynthetic attained. Rather, combining the two geosynthetics had a detrimental effect compared to when only one of the geosynthetics was used.

This trend is also reflected in the CD-Test results shown in Table 5.

Contrary to all expectations, therefore, the provision of a drainage geosynthetic overlying or underlying a reinforcement geosynthetic did not have the expected positive effect on the shear strength characteristics of a cohesive soil.

Figure 4A:
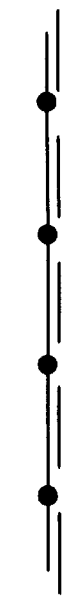
FIG. 4a represents a diagrammatic illustration of a combined geotextile.
Figure 4B:
FIG. 4b represents a diagrammatic illustration of a combined geotextile in use.
Figure 4C:
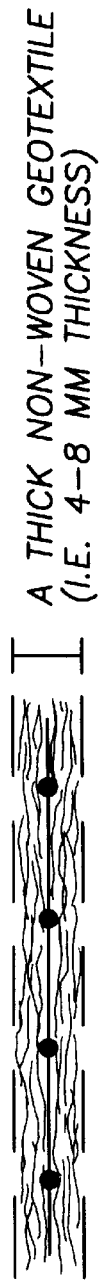
FIG. 4c represents a diagrammatic illustration of a geotextile in accordance with the invention.

Referring now to FIGS. 4a, 4b and 4c there is illustrated an explanation of the results found in Tables 4 and 5. The combination of the drainage geosynthetic G1 and the reinforcement geosynthetic, ie the geogrid G2 shown in FIG. 4a, may have produced low friction due to lubrication between the surfaces of the geosynthetic. This is illustrated in FIG. 4b where a layer of lubrication is indicated between the two layers of geosynthetics. In FIG. 4c our new geosynthetic is shown. It comprises a reinforcement geosynthetic which is positioned inside a relatively thick drainage geosynthetic. The reinforcement geosynthetic is located approximately midway within the drainage geosynthetic. For example, where the drainage geosynthetic has a thickness of 4–8 mm, then the reinforcement geosynthetic is located at a depth of 2–4 mm, so that an equal thickness of drainage geosynthetic is located on either side of the reinforcement geosynthetic.

Surprisingly, we have found that the structure shown in FIG. 4c does not have any of the drawbacks of the G1 G2 combination illustrated in FIGS. 4a and 4b. Rather the structure shown in FIG. 4c offers both drainage and reinforcement properties and therefore increases the shear strength of a cohesive soil.

Figure 15:
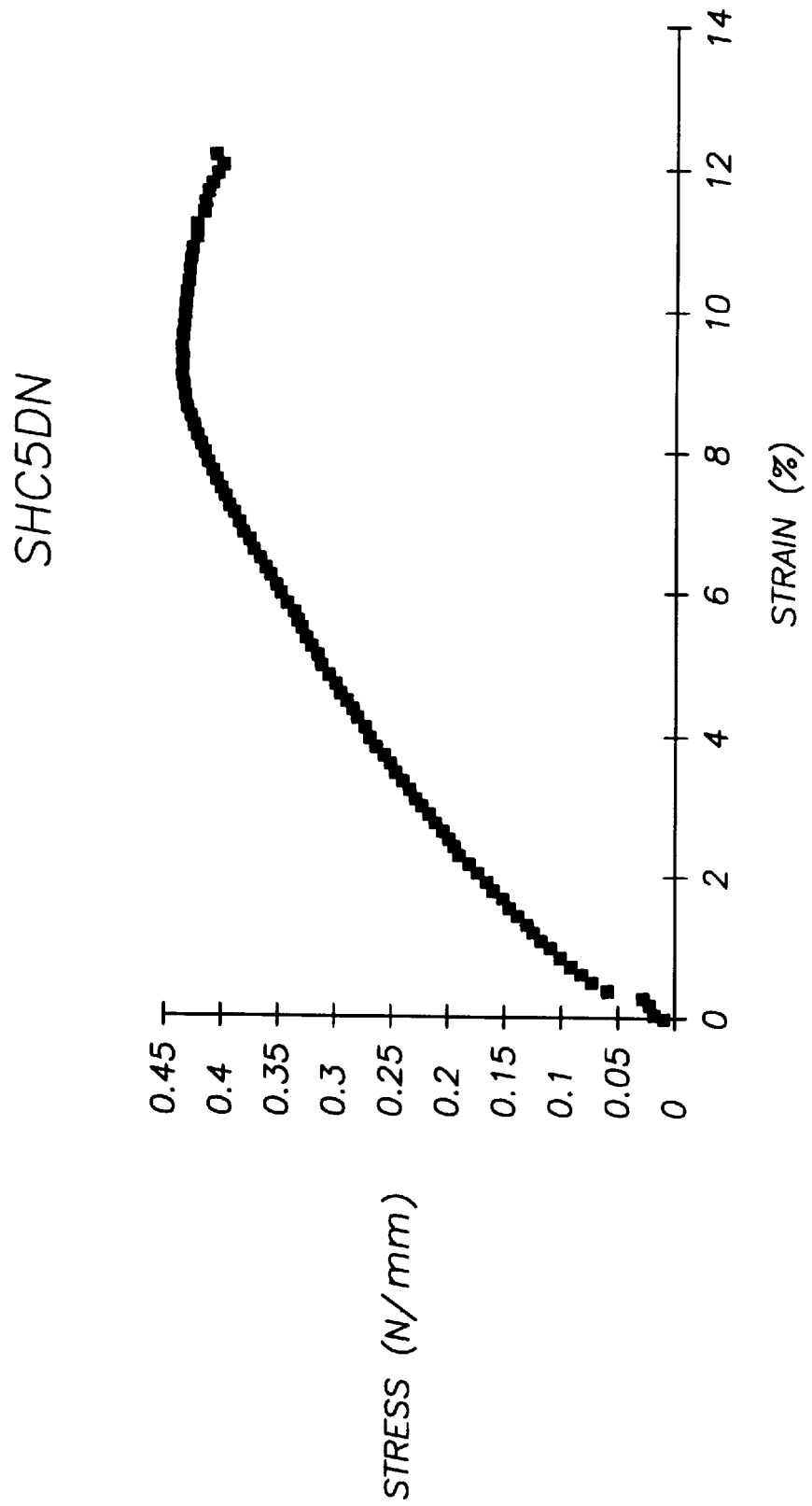
FIG. 15 represents stress strain curve for unconnected material test SHC5DN (consolidated drain test—400 kPa confining pressure).
Figure 16:
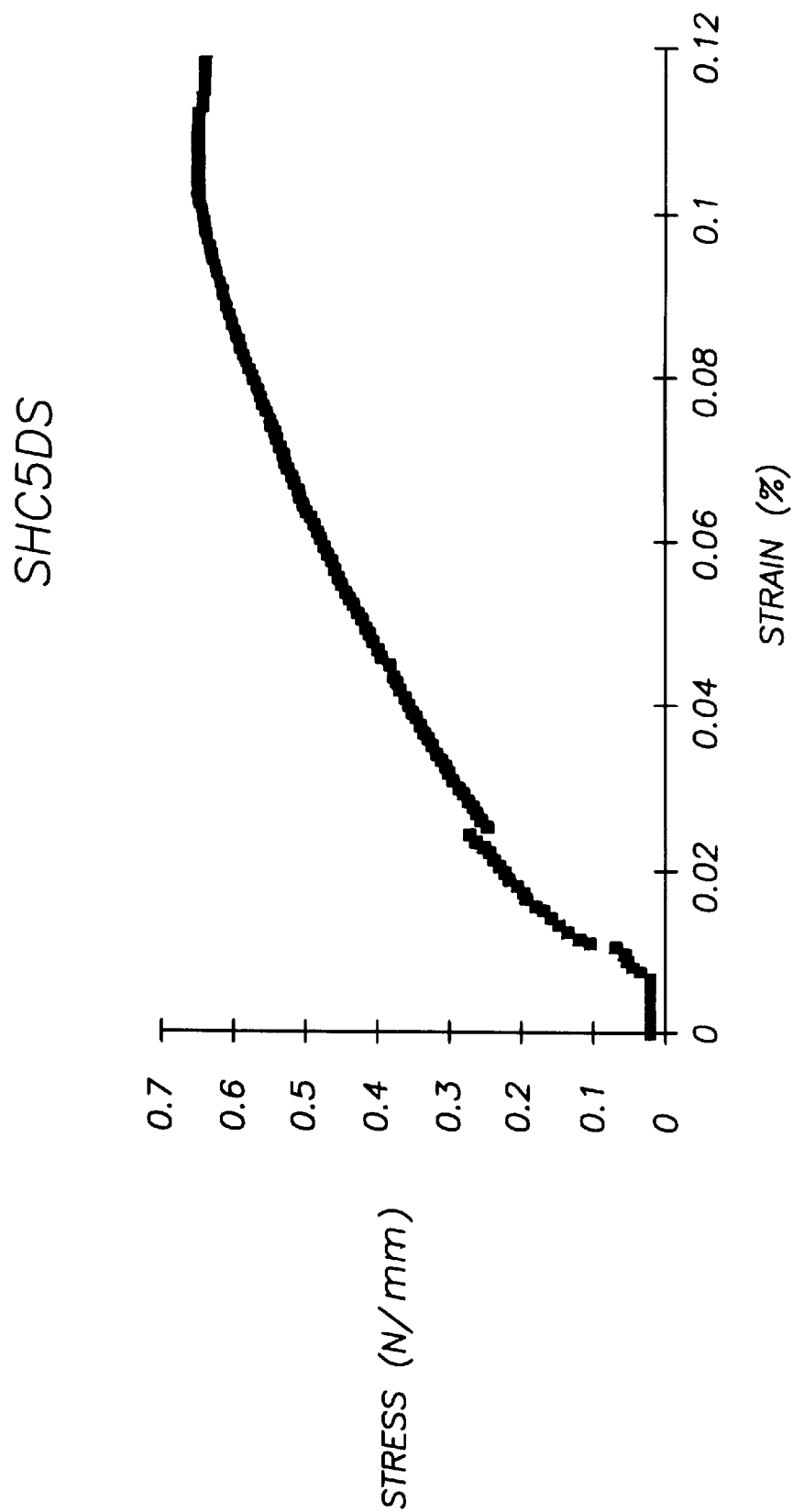
FIG. 16 represents stress strain curve for stitched material test SHC5DS (consolidated drained test—400 kPa confining pressure).

Indeed, we have discovered that the structure shown in FIG. 4c increases the sheer strength of the material and this is illustrated in FIGS. 15 and 16.

FIG. 16 shows the structure shown in FIGS. 4c when stitched together and therefore provided ready for use. It can be seen that the stress strain curve provides data that signifies a sheer strength (to a man skilled in the art) greater than that illustrated in Table 4 or 5.

In addition, a further experiment was undertaken in order to determine the effects of stitching the structure shown in FIG. 4c so as to provide for a structure that is ready for use. It can be seen by comparing FIGS. 15 and 16 that a substantial increase in sheet strength is provided by the structure shown in FIG. 4c when said structure is stitched and so ready for use.

We have therefore identified a surprisingly unexpected result and because of this we have been able to develop a single geosynthetic which has both effective reinforcement and drainage properties. This means that the shear strength of cohesive soils can be increased when used with this inventive geosynthetic and thus such soils can be used in reinforced structures. This has implications for a number of reinforced land structures. For example, steep sided embankments can now be built using the inventive geosynthetic and cohesive soil, thus making best use of land space and available soil type. Similarly, land-fill sites can be provided with steep sided boundaries made from such reinforced structures. This means that the effective amount of space available for land-fill can be increased. It will also be apparent to those skilled in the art that the geosynthetic described in this application can be used in any reinforced land structure where it is desired or necessary to use a cohesive fill.

Moreover, we have also found that our new geosynthetic, when made in part or whole from a material having electroosmotic properties, exhibits enhanced performance in that it expediates and augments the increase in shear strength of a cohesive soil by exploiting electroosmotic effects. Specifically, we have found that the provision of reinforcement material such as a geogrid, which is electrically conductive, is desirable. The reinforcement material can be rendered electrically conductive by making the geogrid or elements of the geogrid electrically conductive.

In order to determine the potential of an electrically conducting geosynthetic to remove preselected species, for example, metals from solution, a number of laboratory tests have been conducted based upon the use of an established geosynthetic material.

The particular geosynthetic use was the 819 material manufactured by the Swedish company Engtex AB. It is composed of 100% polyproplene-an organic carbon derivative with excellent sorptive capabilities and which has previously exhibited high sorbant properties with a variety of substances.

The laboratory tests were based upon the techniques of electrochemistry by placing the geosynthetic material as a compound in an electrolytic cell, containing the metal solution. The objective of the text was to test for sorbance. Once the sorbance of the metal from solution by the geosynthetic material had been established, additional tests were conducted in an attempt to optimise the sorbance by;

1. Modifying the various experimental parameters; and
2. Incorporating a variety of different conductive materials with the geosynthetic material.

These alternative materials included:
802 Polyproplene metallic material (manufactured by Engtex AB)
Brass material
Stainless steel mesh
Visqueen plastic sheeting
Plastic conductive sheeting
0.2 mm stainless steel thread The tests were designed to remove metals from solution by absorbing and/or adsorbing the metals onto and/or into the cathodic design in an electrolytic cell. A presumption inherent to the tests was that the metal is removed from solution by both techniques of absorption and adsorption. The term "sorption" is used to described this removal process of the metal by the geosynthetic design.

In the following tests a geosynthetic was designed to be a cathode in an electrolytic cell. However this method is restricted to electrically conducting materials as the cathode must conduct electricity in order to complete the circuit. It was therefore proposed to use electrically conducting materials and alternatively materials laid out on conducting substrate material so that the cathodic component would be conductive.

The effectiveness with which a material can adsorp and/or absorp is, however, dependent on the migration of the metal ions as well as on the flow of fresh solution into the cathodic material component.

By suitable selection of plating conditions, including current density, bath agitation, temperature and pH, it has proved possible to obtain metal sorption of uniform coating within a carbon fibre. It is often possible to almost completely fill the spaces between the fibres to produce a practically full compact composite.

In the following investigations the experimental procedure commenced with the testing of the most basic and proceeding to more complex designs systematically. Each test comprised of four principal stages including:

(a) Preparation of electrolyte solution for use in the electrolytic cell.

(b) Sorption of metal by geosynthetic design using the electrolytic cell.

(c) Leaching of the 819 material with 10% nitric acid to remove metal sorbed.

(d) Examination of leached material for metal presence and concentration using atomic absorption spectroscopy.

Control sampling was done as a preliminary check to ensure that the specific metal was not already present in the 819 material. Results indicated a minute quantity, usually of the order less than 0.5%, present in the material prior to testing in the metal solutions. This quantity was considered to represent impurities and/or errors in the testing system.

Design No. 1

Figure 5:
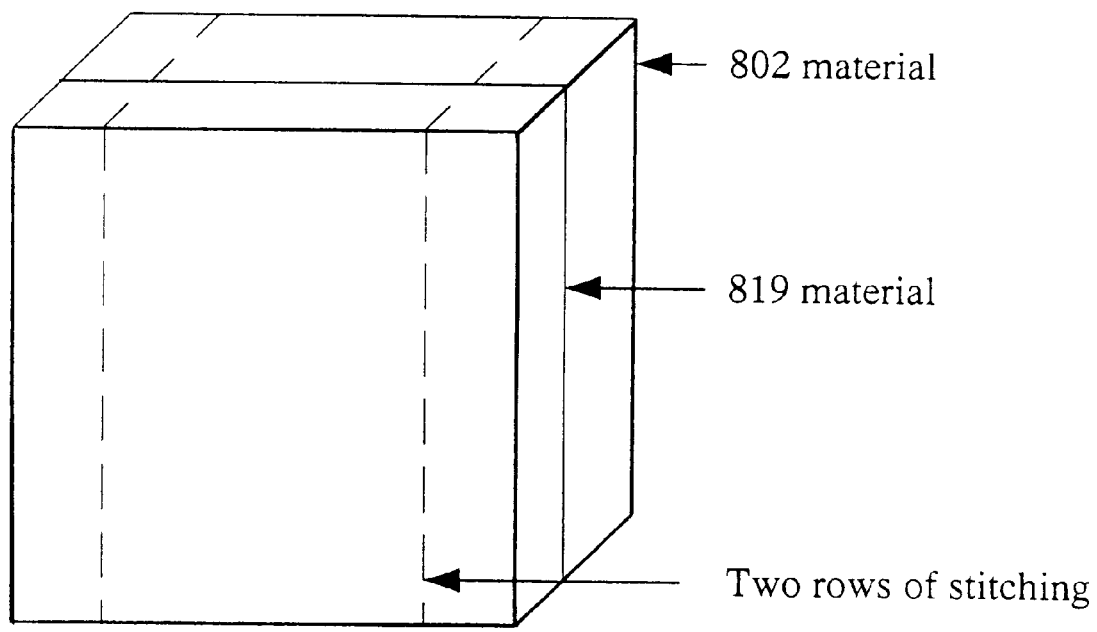
FIG. 5 represents design number 1 of a geosynthetic in accordance with the invention.
Figure 6:
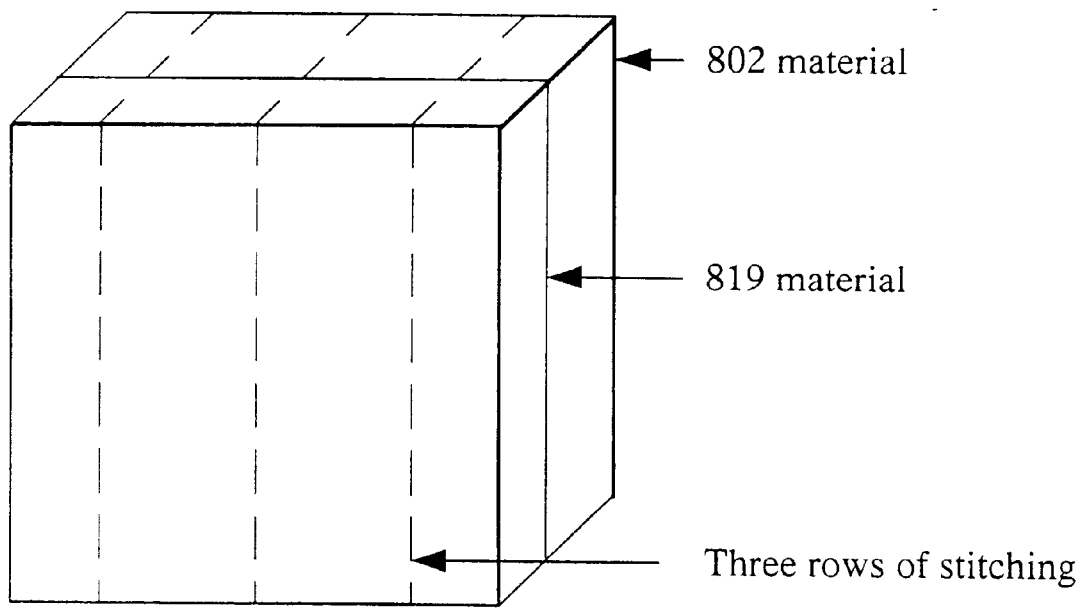
FIG. 6 represents design number 2 of a geosynthetic in accordance with the invention.

The initial design consisted of a basic square (150 mm×150 mm) of 819 polyproplene sorbant material and a similar size (150 mm×150 mm) of 802 polyproplene material containing metal fibres to assist conduction of the current. These two squares of the material were sewn together with two rows of stainless steel thread, conducive to current conduction throughout the geosynthetic design, FIG. 5.

The current was transferred to the stainless steel wires via a crocodile clip. A lead anode was used as lead has a higher electrode potential E° than aluminium and will thus reduce aluminium and deposit it on the cathode.

Aluminium $Al^{3+} = -1.66E°$

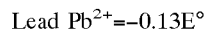
Lead $Pb^{2+} = -0.13E°$

Preparation of the aluminium electrolyte solution

A two liter flask and a 10 ml pipette were rinsed with deionised water and a small amount of aluminium solution. Two mls of aluminium in 0.5 nitric acid was placed in the flask using the pipette. (The aluminium nitrate standard solution was prepared with nitric acid during initial laboratory manufacture. This acid proved of negligible effect, however, as the small amount used (two mls) was diluted two thousand times in the two liter flask leaving a minute amount of nitric acid in the final solution.) The solution was then made to the mark with deionised water and the flask inverted several times to ensure adequate mixing. The resulting concentration of the aluminium solution was of magnitude 1 μg/ml. This models the concentration of aluminium present in an average lake or aquatic environment.

Sorption of aluminium by the geosynthetic design in the electrolytic cell

Figure 17:
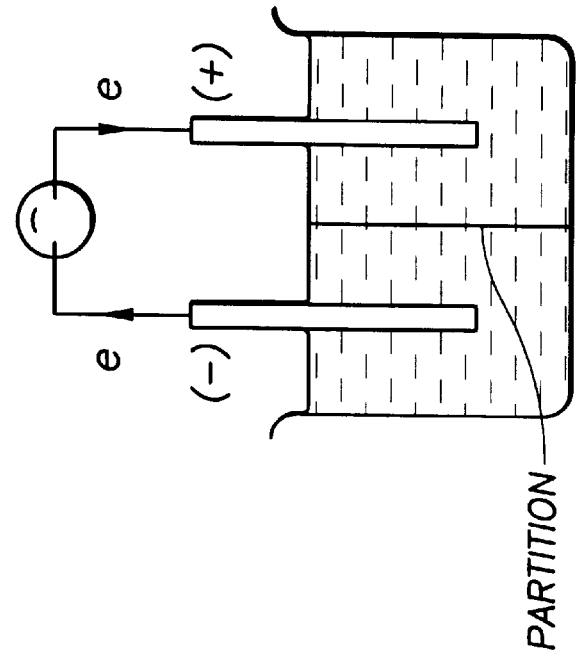
FIG. 17 represents standard designs of a electrolytic cell and an electrochemical cell.
Figure 17:
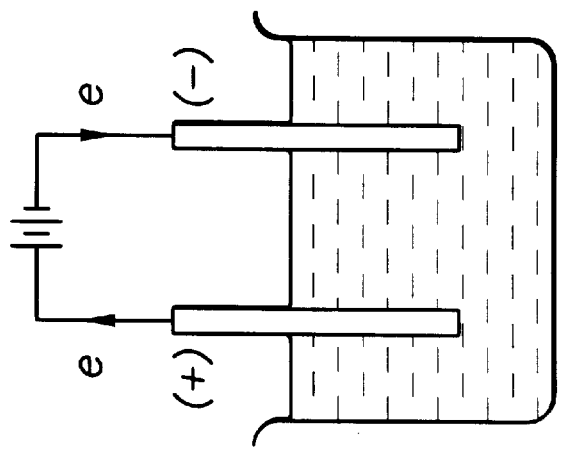

In the preparation for setting up the electrolytic cell, the lead anode was cleaned with acetone. The electrolyte container was rinsed with deionised water and filled with the aluminium electrolyte solution prepared earlier. The electrolyte cell was arranged as outlined in FIG. 17 and the current connected via crocodile clips to the anode and the cathode. The current was set at 12 volts and allowed to circulate for 3–4 hours.

Leaching of the 819 material with 10% nitric acid to remove the aluminium sorbed Three 400 ml beakers were rinsed with deionised water and labelled. The samples of 819 material were removed from their cathodic structure by unstitching the stainless steel stitching. This ensured minium interference from the stainless steel. The three 819 samples were cut into eight squares and placed in the labelled beakers. Each was then weighed to ascertain the weight of the 819 material prior to leaching.

The 10% acid was prepared in the fume cupboard. 700 ml of 10% nitric acid was prepared in respective 500 ml and 200 ml flasks. Each flask was initially rinsed with deionised water and 20 mls and 50 mls of nitric acid were placed in the 200 ml and 500 ml flasks respectively. The remainder of the solutions were made to the mark using deionised water. This ensured a 10% nitric acid solution in each flask. Both flasks were inverted to ensure adequate mixing occurred.

A graduated cylinder was then rinsed with deionised water and 200 mls of 10% nitric acid solution was measured and emptied into each labelled beaker containing the 819 material. This ensured the entire 819 material was immersed in the solution.

The beakers were allowed to leach for 48 hours in the fume cupboard.

Examination of leached liquid for aluminium presence and concentration using atomic absorption spectroscopy A further three 400 ml flasks were rinsed with deionised water and labelled. The leached solutions were poured into their respective flasks and the 819 material was further leached with deionised water. This was also drained off into the new respective flasks. The hotplate vibrator was used to evaporate the water in the solution until 100 ml remained.

Design No. 2

The second design was modelled on the initial design of two squares (150 mm×150 mm) of fresh 819 material and 802 metallic material. This sample was stitched with three rows of stainless steel thread to increase the conductivity of the cathode design. For copper a stainless steel anode was utilised to reduce the copper metal in the solution and deposit it on the cathode.

Preparation of the copper electrolyte material

The preparation method to produce the aluminum electroyle solution was repeated for the copper electrolyte solution. Two mls of cupric nitrate standard solution was used.

Sorption of copper by the geosynthetic design in the electrolytic cell

The apparatus and procedure used in the sorption of aluminum was repeated. However for copper the voltage was increased to 25 volts.

Leaching of the 819 material with 10% nitric acid to remove the copper sorbed

The procedure for aluminum leaching was repeated for copper.

Examination of leached liquid for copper presence and concentration using atomic absorption spectroscopy The procedure for aluminium examination using the atomic absorption spectroscopy apparatus was repeated for copper evaluation.

The design was repeated with three further samples.

Design No. 3

The third design consisted of two squares (150 mm×150 mm) of 819 material and 802 metallic material. However this sample was stitched with a further five rows of stainless steel thread to increase the conductivity of the cathode design.

The four stages of design No. 2 were repeated in this design.

Design No. 4

Figure 7:
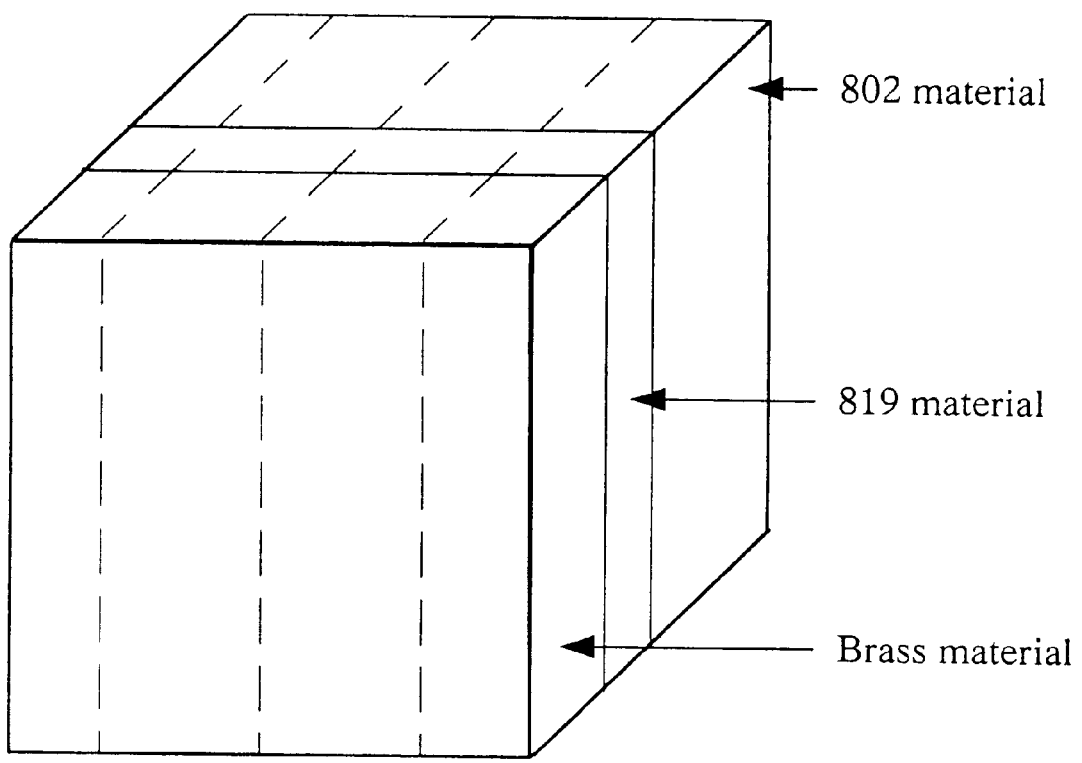
FIG. 7 represents design number 4 of a geosynthetic in accordance with the invention.

The fourth design consisted of fresh squares (150 mm×150 mm) of 819 polyproplene material and 802 metallic fibre material and a square (150 mm×150 mm) of brass material. The purpose of this additional brass material was to increase the conductivity throughout the cathode component. The three layers were stitched together with three rows of stainless steel stitching to ensure current conduction throughout the sample, FIG. 7.

Preparation of the copper electrolyte solution

The procedure used before was repeated.

Sorption of copper by the geosynthetic design in the electrolytic cell

The electrolytic cell apparatus was used, with the voltage remaining at 25 volts.

Leaching of the 819 material with 10% nitric acid to remove the metal sorbed

As before.

Examination of leached liquid for copper presence and concentration using atomic absorption spectroscopy As before.

Design No. 5

Figure 8:
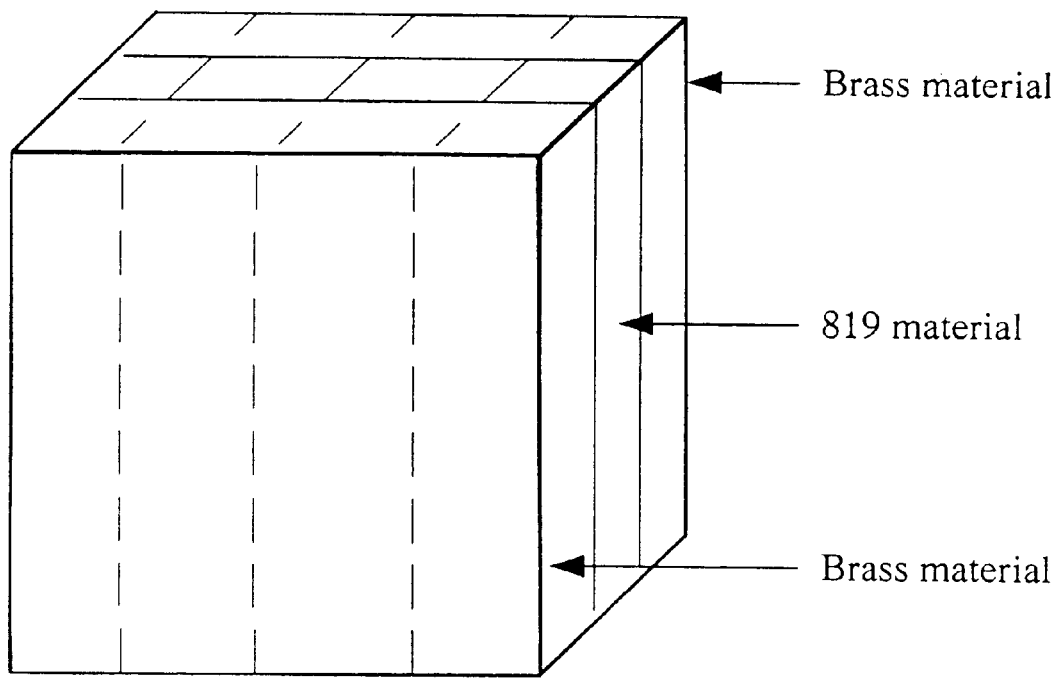
FIG. 8 represents design number 5 of a geosynthetic in accordance with the invention.

In the fifth design a square of (150 mm×150 mm) polyproplene material was sandwiched between two sheet layers of brass material also measuring (150 mm×150 mm). The aim of the two brass layers was to further increase the conductivity of the cathodic component. These three layers were stitched together with three rows of stainless steel stitching, FIG. 8.

Preparation of the copper electrolyte solution

As before.

Sorption of copper metal by the geosyntheric design in the electrolytic cell

As before.

Leaching of the 819 material with 10% nitric acid to remove the metal sorbed

As before.

Examination of leached liquid for copper presence and concentration using atomic absorption spectroscopy As before.

Design No. 6

The sixth design comprised a square of 819 polyproplene material (150 mm×150 mm) with two sheets of brass material (150 mm×150 mm) stitched together. It was proposed to attach the +ve lead to one sheet of the brass material and the −ve lead to the other sheet of the material. The aim of this design was to increase the current flow passing through the material.

Preparation of the copper electrolyte solution

As before.

Sorption of copper by the geosynthetic design in the electrolytic cell

The electrolytic cell apparatus was set up as before; however, the anode component was omitted. The circuit was connected by attaching the +ve connection to the sheet of brass material and the −ve connection to the opposite sheet of brass material. A voltage of 25 volts was applied as before.

Leaching of the 819 material with 10% nitric acid to remove the metal sorbed

As before.

Examination of leached liquid for copper presence and concentration using atomic absorption spectroscopy As before.

Design No. 7

In the seventh design the apparatus was altered to adapt the experiment for its ultimate use—as a single layer capable of sorbing metals from lakewater when placed in situ on the lake bed. To achieve this it was attempted to incorporate both anode and cathode components into one single sheet of material.

A section of 819 polyproplene material (150 mm×150 mm) was cut and stitched using three rows of stainless steel stitching to a brass section also measuring (150 mm×150 mm). This would comprise tie cathodic component.

Figure 9:
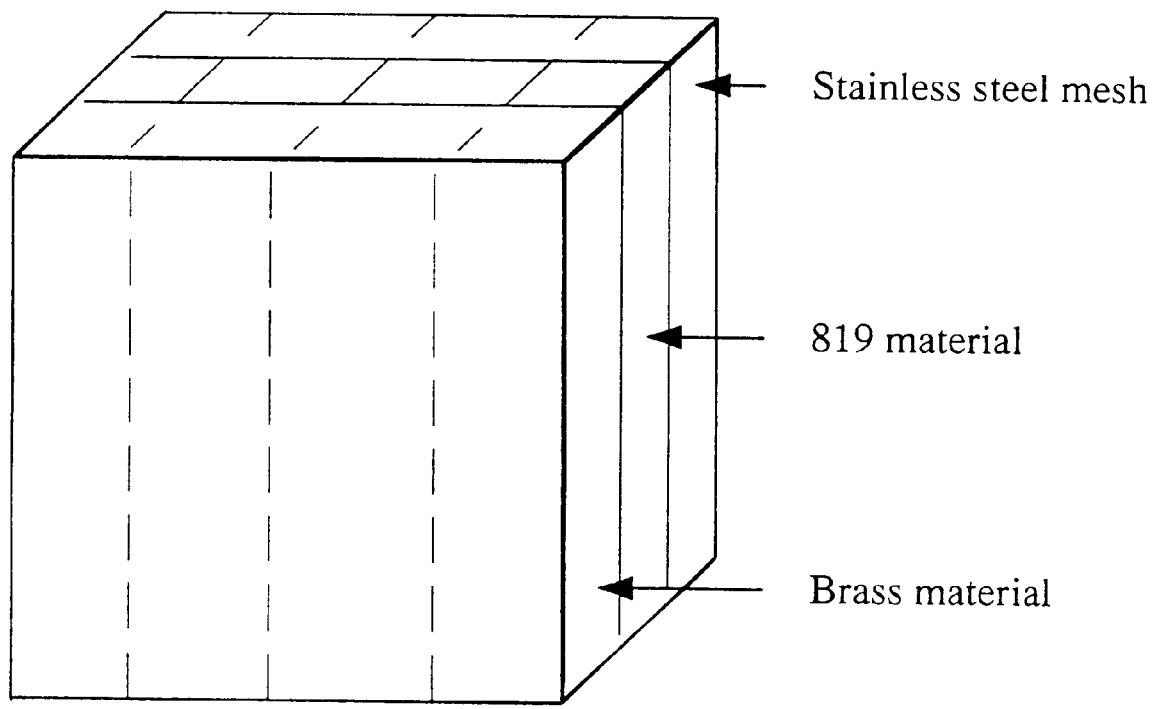
FIG. 9 represents design number 7 of a geosynthetic in accordance with the invention.

A section of stainless steel mesh (150 mm×150 mm) was cut and attached to the cathode component using normal non-conductive thread. This would ensure that the entire material would not short by use of this nonconductive thread between the anode and the cathode components. It was intended that the stainless steel mesh act as the anode component in the material, FIG. 9.

Preparation of the copper electrolyte solution
As before.

Sorption of copper by the geosynthetic design in the electrolytic cell

The apparatus was set up as before; however, this time the current was connected by attaching the +ve lead to the stainless steel mesh via a crocodile clip and the −ve lead to the cathodic component as before. The cathodic component was stitched with stainless steel stitching in three rows as before. This ensured that the cathodic component and the anodic component were connected, as before, with both anode and cathode components existing as one material more suitable for use as a remedial clean-up measure for lakes.

The voltage remained the same at 25 volts.

Leaching of the 819 material with 10% nitric acid to remove the metal sorbed
As before.

Examination of leached liquid for copper presence and concentration using atomic absorption spectroscopy
As before.

Design No. 8

Figure 10:
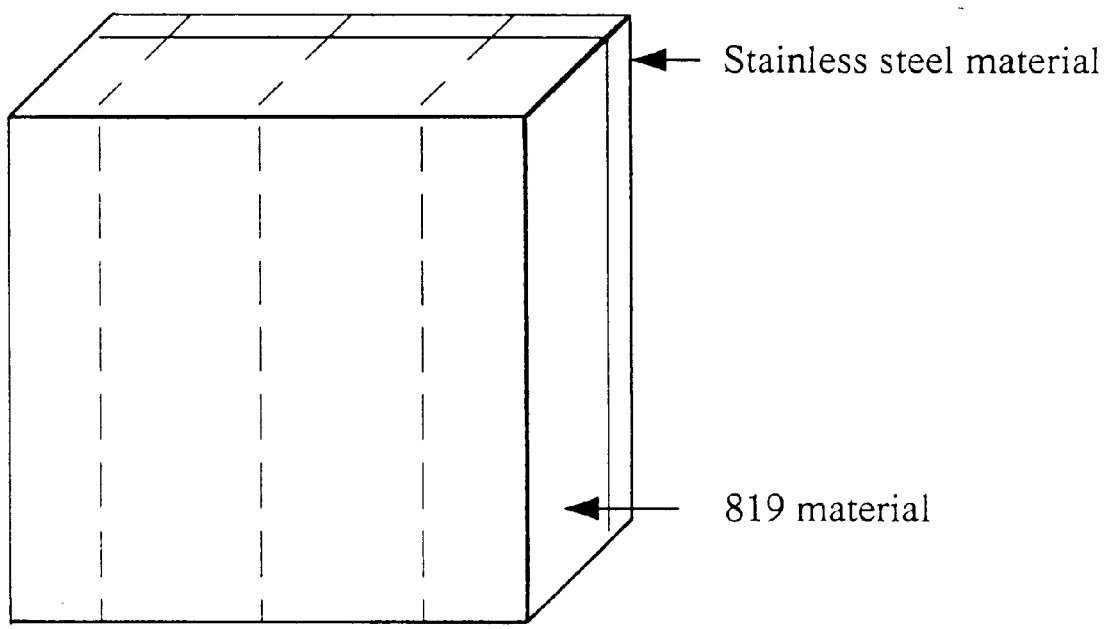
FIG. 10 represents design number 8 of a geosynthetic in accordance with the invention.

In this design the base sheet of 819 material (150 mm×150 mm) was attached to a sheet of stainless steel material (150 mm×150 mm). Both layers were attached by three rows of stainless steel stitching to each other, FIG. 10.

Preparation of the copper electrolyte solution
As before.

Sorption of copper by the geosynthetic design in the electrolytic cell
As before.

Leaching of the 819 material with 10% nitric acid to remove the copper sorbed
As before.

Examination of leached liquid for copper presence and concentration using atomic absorption spectroscopy
As before.

Design No. 9

Figure 11:
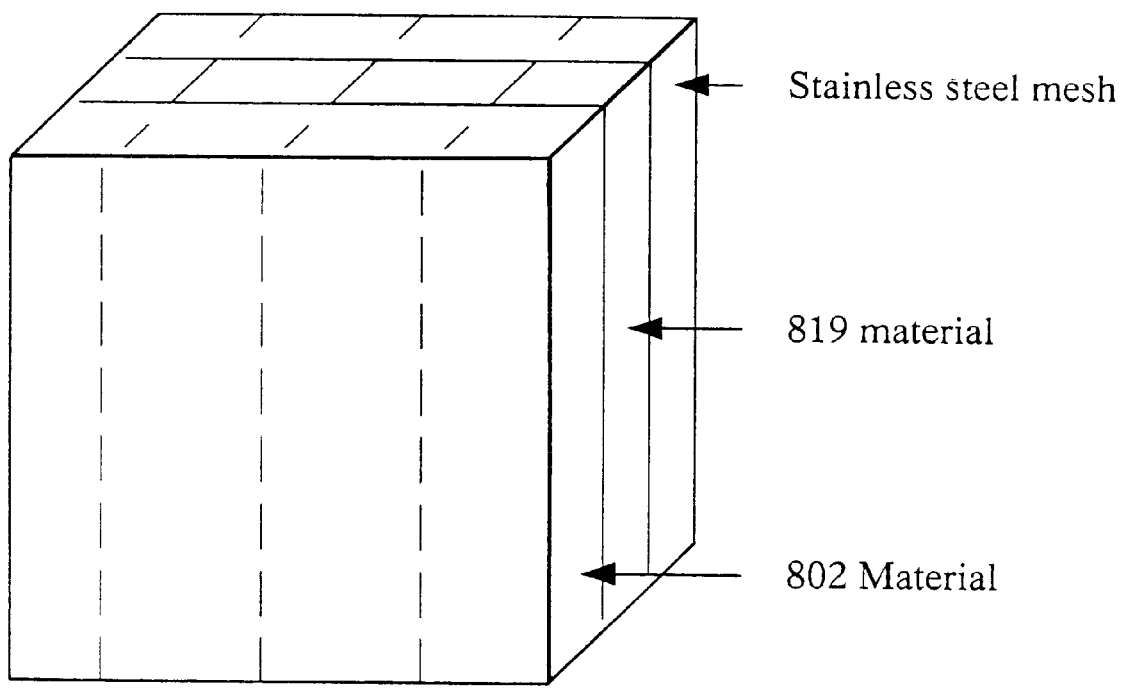
FIG. 11 represents design number 9 of a geosynthetic in accordance with the invention.

In this design, design 8 was modified to include a layer of 802 metallic fibre material (150 mm×150 mm) stitched to the two layered structure of 819polyproplene and stainless steel (150 mm×150 mm). The three layers were stitched together with three rows of stainless steel stitching. The addition of a layer of 802 metallic fibre material comprised an attempt to further increase the conductivity of the cathodic component, FIG. 11.

Preparation of the copper electrolyte solution
As before.

Sorption of copper by the geosynthetic design in the electrolytic cell
As before.

Leaching of the 819 material with 10% nitric acid to remove the copper sorbed
As before.

Examination of leached liquid for copper presence and concentration using atomic absorption spectroscopy
As before.

Design No. 10

The tenth design comprised a further modification of the design 7 which was constructed to adapt the apparatus for its use as a single sorbing layer on the lakewater bed. To achieve this the anodic and the cathodic components were incorporated into the design as one layer.

Figure 12:
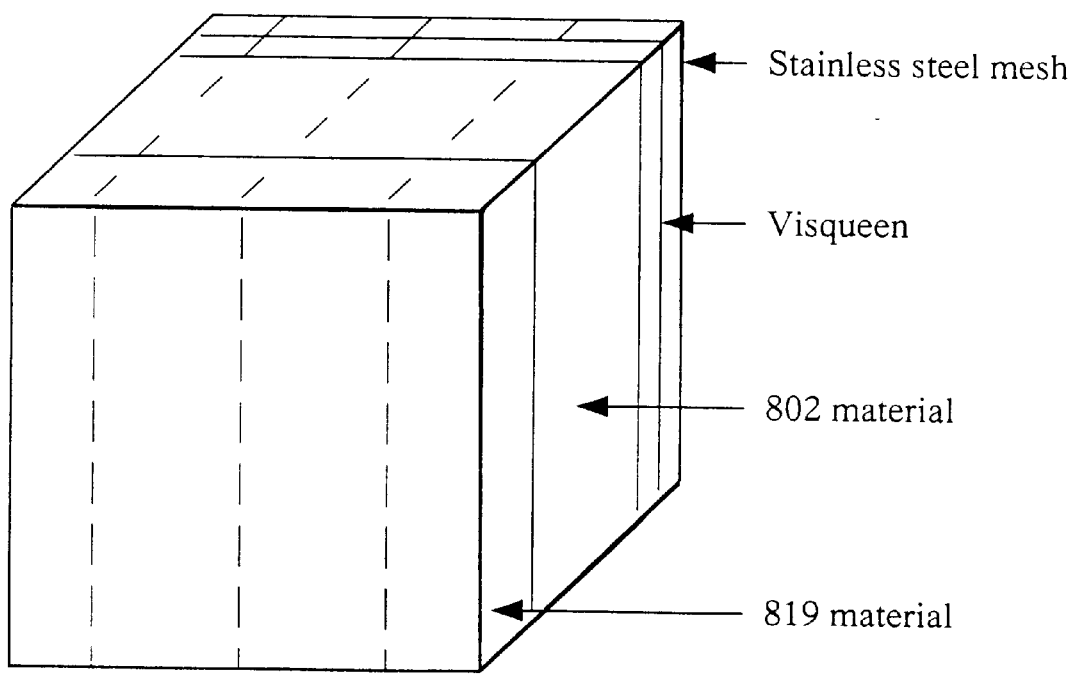
FIG. 12 represents design number 10 of a geosynthetic in accordance with the invention.

In design 10 this idea was taken further by introducing a non-conducting layer between the anodic and the cathodic components in the single layer design. Specifically this entailed using another sheet of stainless steel as the anode. Attached to this via non-conductive thread was the non-conductive layer—visqueen, a pvc product utilised in house insulation, and adjacent to the visqueen, via non-conductive thread again, was the cathodic component—802 conducting material and the 819 absorbing material. The final multi-layered design now consisted of its anodic and cathodic component separated by a non-conductive layer. This non-conductive layer, visqueen was to prevent shorting of the circuit, FIG. 12.

Preparation of the copper electrolyte solution
As before.

Sorption of copper by the geosynthetic design in the electrolytic cell

The multi-layered design was placed in the electrolyte solution, as before, with the current entering the apparatus via the +ve lead to the stainless steel anode and leaving the via the −ve lead 802 and 819 cathodic component. The voltage remained at 25 volts.

Leaching of the 819 material with 10% nitric acid to remove the copper sorbed
As before.

Examination of leached liquid for copper presence and concentration using atomic absorption spectroscopy
As before.

Design No. 11

The eleventh design comprised a repeat of design 5 as the results were of a non-conclusive nature. The design and procedure of design 7 were repeated exactly.

Design No. 12

Figure 13:
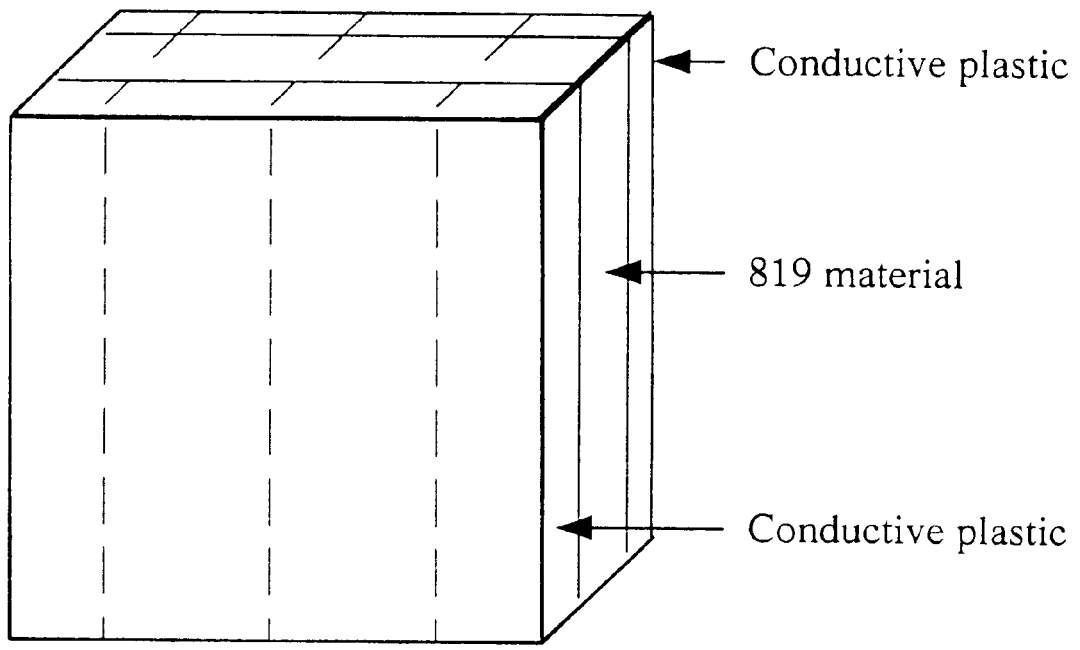
FIG. 13 represents design number 12 of a geosynthetic in accordance with the invention.

In the twelfth design a layer of 819 material (150 mm×150 mm) was sandwiched between two layers of conductive plastic sheeting each (150 mm×150 mm). This would comprise the cathodic component and was stitched, once again, with three rows of stainless steel stitching, FIG. 13.

Preparation of the copper electrolyte solution
As before.

Sorption of copper by the geosynthetic design in the electrolytic cell

The apparatus was set up as before with both the anode and the cathode component dipping separately into the electrolyte solution as before. The voltage applied remained at 25 volts.

Leaching of the 819 material with 10% nitric acid to remove the copper sorbed
As before.

Examination of leached liquid for copper presence and concentration using atomic absorption spectroscopy
As before.

Design No. 13

In designs 12, 13 and 14 an attempt was made to alter the experiment variables of voltage, time and cathode thickness.

Design 13 comprised an attempt to alter the voltage applied to the electrolytic cell. It was decided to lower the voltage to 10 volts. The original design of 819 absorbing material and 802 conducting material with three rows of stainless steel stitching was utilised as this achieved a high degree of metal sorbance.

Preparation of the copper electrolyte solution

As before.

Sorption of copper by the geosynthetic design in the electrolytic cell

The apparatus was set up as before with the sample parameters of electrolyte concentration, anodic component, room temperature and duration of the experiment. Only the voltage was allowed to vary—this was allowed to circulate at a lower voltage of 10 volts as opposed to 25 volts used previously.

Leaching of the 819 material with 10% nitric acid to remove the copper sorbed

As before.

Examination of leached liquid for copper presence and concentration using atomic absorption spectroscopy As before.

Design No. 14

Figure 14:
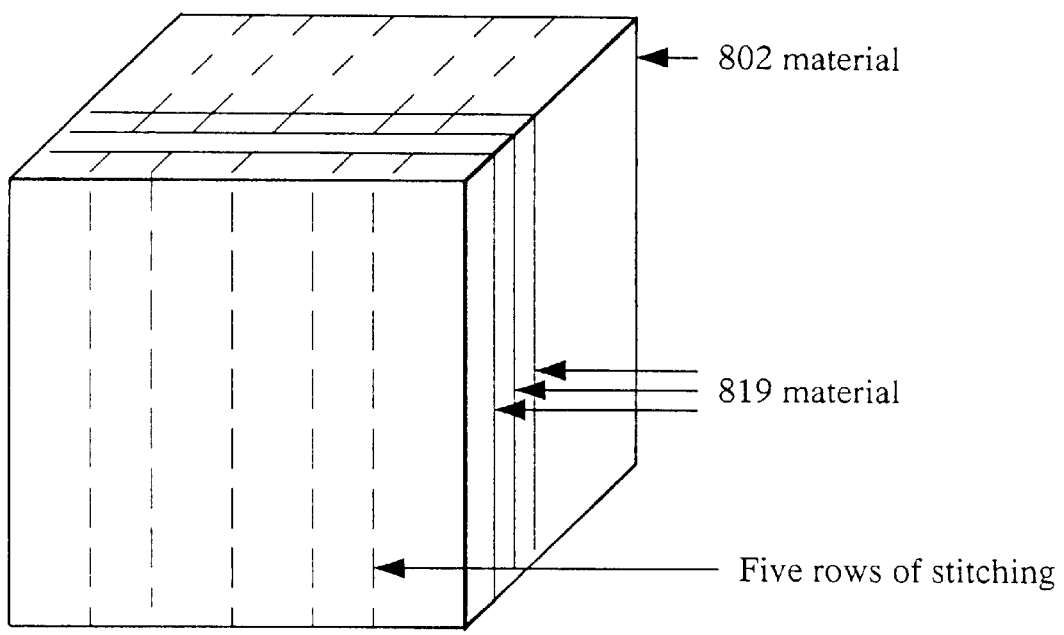
FIG. 14 represents design number 14 of a geosynthetic in accordance with the invention.

In this design it was attempted to alter the cathode thickness. As such three layers of 819 material was stitched with three rows of stainless steel stitching to a layer of 802 conducting material, FIG. 14.

Preparation of the copper electrolyte solution

As before.

Sorption of copper by the geosynthetic design in the electrolytic cell

The experiment was run as previous experiments.

Leaching of the 819 material with 10% nitric acid to remove the copper sorbed

As before.

Examination of leached liquid for copper presence and concentration using atomic absorption spectroscopy As before.

Design No. 15

Finally in design 15 the length of the experimental time was varied. The design was again a replica of design 2 throughout the four stages.

Preparation of the copper electrolyte solution

As before.

Sorption of copper by the geosynthetic design in the electrolytic cell

The experiment was allowed to run for eight hours as opposed to the normal four hours.

Leaching of the 819 material with 10% nitric acid to remove the copper sorbed

As before.

Examination of leached liquid for copper presence and concentration using atomic absorption spectroscopy As before.

Design Nos. 16–20

A selection of common metals, namely zinc (Zn), nickel (Ni), Cobalt (Co), Cadmium (Cd) and Chromium (Cr), were next tested for sorption by the geosynthetic design. These metal elements are found in the everyday environment any may often be traced to lakewater. It was for this reason that they were selected.

The cathodic design of each consisted of the basic square of 819 material (150 mm×150 mm) stitched with three rows of stainless steel stitching to a similar square of (150 mm×150 mm) 802 material, as it was this design that proved to have the highest subsequent sorbance value to date. The lead anode used before was reused as lead has a higher electrode potential $E°$ than zinc, nickel, cobalt, cadmium and chromium and should therefore reduce the metals from their respective solutions.

Each test was run under the same conditions as before—by allowing 25 volts to circulate in the electrolytic cell for 3–4 hours.

The four stages of electrolyte preparation, sample testing, sample leaching and examination by the AAS equipment were repeated, with only the initial stage of electrolyte preparation differing—the details of which are as follows:

Preparation of the zinc electrolyte solution

A repeat procedure of the initial aluminium electrolyte preparation was performed with the exception that 2 mls of zinc standard solution was used to make the electrolyte solution. The resulting concentration of the zinc electrolyte was therefore the same as the two previous aluminium and copper electrolytes—1 $\mu$m/ml, thus modelling the concentration of the zinc metal content in lakewater.

Preparation of the nickel electrolyte solution

The procedure as before was employed using 2 mls of nickel concentrate. The resulting concentration was again 1 $\mu$g/ml.

Preparation of the cadmium electrolyte solution

As before 2 mls of cadmium standard solution was used initially instead of 2 mls of aluminium nitrate. The concentration achieved was 1 $\mu$g/ml.

Preparation of the cobalt electrolyte solution

The original procedure was repeated using, initially, 2 mls of cobalt standard solution. Resulting concentration, as before, was 1 $\mu$g/ml.

Preparation of the chromium electrolyte solution

The final electrolyte solution was prepared using an initial concentrate of 2 mls of chromium nitrate solution. A concentration of 1 $\mu$g/ml was attained.

Results

Results from the soaked sampled illustrated that the 819 polyproplene material did not sorb the metal from solution in any specific case of metal. The small quantities obtained, usually in the order of up to 2%, should also be disregarded as of little consequence.

Results from the electrolysed samples of the 819 polyproplene material clearly indicate that the material does sorb metal, albeit in small quantities, when placed as a cathodic component in an electrolytic cell. The quantity of sorbance varies, depending on the nature of the cathodic design. It was concluded that the primary objective of the tests had been achieved—namely to isolate a principle whereby the 819 polyproplene material would sorb metals from solution by placing it as the cathodic component in an electrolytic cell.

Results from the testing of various different designs, all performed under the same experimental conditions, indicated that the electrolysed design 3, consisting of a layer of 819 material and a layer of 802 material stitched with five rows of stainless steel thread, sorbs the maximum metal from solution. A value of 16.70% was obtained.

Results from design 5 and design 11 were disregarded due to inaccuracies. These inaccurate results can only be explained by citing the negative effect of the brass material on sorbance of the metal. This is further enhanced by comparing results of design 4 and design 2. Sorbance values for electrolysed sample of design 2 are quite good—a value of 12.53% was obtained. However, values for design 4—an exact replica of design 2 apart from the addition of a layer of brass material—illustrate a much smaller quantity of sorbance (3.35%) indicating that the layer of brass material might have reduced the conductivity of, the design thus reducing the quantity of metal sorbed.

Designs 6 and 7 were not a success. The idea of omitting the anode component and attaching both −ve and +ve leads to the cathode design, in an attempt to increase current circulation, only succeeded in shorting the entire circuit, thus achieving the opposite effect by obliterating any current in the circuit of the design. Without current the metal does not venture out of its solution thereby little sorbance could occur.

Design 8, consisting of the 819 material and a stainless steel mesh to enhance conductivity and hence sorbance, did indeed sorb some metal from solution; however, results show values of less sorbance (4.93%) than other designs indicating that the stainless steel mesh is not as good a conductor as the 802 material used previously. In design 9, where a layer of 802 material was added to design 8, values of sorbance increased to 6.99% substantiating the fact that the stainless steel conductor is less effective than the 802 material.

Design 10 was an attempt to modify the material configuration for sorbance in natural water conditions, by incorporating the anode and the cathode into one component, separated by a non-conductive layer to prevent shorting of tie circuit (as in design 6 and 7). Results indicate that a small value of sorbance (3.36%) was achieved. However, this design was not a success as the 819 polyproplene material seemed to burn releasing a black ash residue into the metal water solution. In addition a distinct yellow tinge was emitted by the brass material. It would appear that the metal water solution was cleaner prior to sorbance testing and this design did not enhance the quality of the solution.

Design 11 provided an alternative example of cathode design by using a conductive plastic sandwiching a layer of 819 material on both sides. This design achieved a poor sorbance value of 2.95% in comparison with other designs. This was as expected as plastic, regardless of its conductivity, will provide poor current circulation.

The second stage of experimental design involved varying the standard experimental conditions to achieve maximum sorbance of the metal by the 819 material. Three parameters of voltage, cathode thickness and time were altered to compare with the electrolysed sample of design 3 sorbance value.

Design 13 involved reducing the voltage applied from its standard value of 25 volts to a value of 12 volts, keeping all other conditions standard. The percentage sorbance value of metal was 8.85%, approximately half the original value of 16.70%. Hence it may be concluded that, for this particular design, reducing the voltage reduces the percentage of sorbance of the metal.

Design 14 comprised an attempt to alter cathode thickness by incorporating three layers of 819 material in the design. A total percentage value of 17.25% sorbance was achieved: however, each layer was tested separately revealing that the exposed outer layer of 819 material sorbed the maximum value of metal (11%) indicating that the quantity of exposed surface area is an important parameter in sorbance. In addition this might also imply that quantities of the metal may simply be deposited on the surface of the 819 material (known as electrodeposition) rather than sorbed into the material. The centre and inner layers illustrated values of 3.7% and 2.55% sorbance respectively, indicating that the quantity of metal sorbed decreases inwards. This further enhances the theory that electrodeposition of metals is greater than actual sorbance into the 819 material.

Finally in design 15 the experiment run-time was varied by increasing it by four hours to observe any effect on the percentage metal removed by the 819 material. Usually the longer the time allowed for sorbance the less sorbance occurred. A value of percentage metal sorbed of 9% was achieved. This is in comparison to the identical design 3 where a value of 16.7% was achieved. This phenomenon can only be explained by suggesting that perhaps desorption of metal occurs after a certain maximum value of metal sorption has been obtained. Desorption is when a substance that has previously been sorbed from solution is replaced into that solution. However, this may simply not be the case— human or experimental error may be the result of this unusual value. More testing and research will therefore be required. Finally the third stage of experimental design involved simply testing other metals for sorbance of the 819 material in an electrolytic cell. These metals included zinc, nickel, cobalt, cadmium and chromium. Percentage metal sorbance values of 14.35%, 5.76%, 14.36%, 8.44% and 1.38% were obtained respectively, resulting in sorbance values in the order:

$$CR > ZN > Co > Cd > Ni$$

It should be noted that the percentage of nickel sorbance attained is probably incorrect due to a distinct experimental error. In addition all five metals released a distinct black residue into the metal solutions thus questioning this procedure of metal remediation using these metals. More research will be required.

The above tests show that it is possible to sorb metals from a water solution using a geosynthetic material when said geosynthetic is incorporated as a cathode component in the electrolytic cell. The geosynthetic material does not sorb metal when simply soaked in a metal solution. It is therefore the action of the current that is one of the most vital parameters in the experimental technique.

We claim:

1. A composite geosynthetic comprising a first reinforcement material and a first drainage material adjacently disposed to one another, wherein at least one of said first reinforcement and said first drainage material comprises electrically conductive material so that at least one of said first reinforcement material and said first drainage material is electrically conducting whereby the composite geosynthetic is adapted to act as an electrode.

2. A composite geosynthetic according to claim 1, further comprising a second drainage material, wherein said first reinforcement material is interposed between said first drainage material and said second drainage material so that equal amounts of said drainage material are provided on either side of said reinforcement material.

3. A composite geosynthetic according to claim 1, wherein said first reinforcement material is electrically conducting.

4. A composite geosynthetic according to claim 1, wherein said first drainage material is a planar geosynthetic.

5. A composite geosynthetic according to claim 1, wherein said first drainage material is made of a polymeric material.

6. A composite geosynthetic according to claim 5, wherein said polymeric material includes polypropylene fibers.

7. A composite geosynthetic according to claim 1, wherein said first drainage material has meshed core spaces therein and comprises filler on both sides thereof.

8. A composite geosynthetic according to claim 1, wherein said first reinforcement material is a geogrid.

9. A composite geosynthetic according to claim 1, wherein said electrically conducting material comprises a composite layer being held by stitching wherein said stitching is made of an electrically conducting material.

10. A composite geosynthetic according to claim 9, wherein said composite layer comprises at least one layer of polypropylene.

11. A composite geosynthetic according to claim 9, wherein said composite layer comprises at least one layer of metallic polypropylene.

12. A composite geosynthetic according to claim 9, wherein said composite layer comprises at least one layer of polypropylene and one layer of metallic polypropylene.

13. A composite geosynthetic according to claim 9, wherein said electrically conducting material comprises stainless steel thread.

14. A composite geosynthetic according to claim 9, wherein said composite layer comprises polypropylene layered one top of another.

15. An electrically conductive geosynthetic comprising said geosynthetic of claim 1 which further comprises at least one electrically conducting filament, said filament being woven or threaded therein.

16. A composite geosynthetic according to claim 15, wherein said filament is multistranded.

17. A geosynthetic according to claim 16, wherein said filament is a composite yarn, wherein said yarn includes at least one electrically conducting filament.

18. An arrangement comprising a pair of composite geosynthetics adapted to act as electrodes according to claim 1, separated by ground material, the electrodes being adapted to be oppositely charged.

19. A method of improving the consolidation and reinforcement of soil and/or removing or electrosorbing contaminants from soil under the action of an electric field using a mechanism selected from the group consisting of electro-osmosis, electromigration and electrophoresis comprising providing an arrangement according to claim 18 and applying an electric field between the electrodes.

* * * * *